Patented Apr. 21, 1931

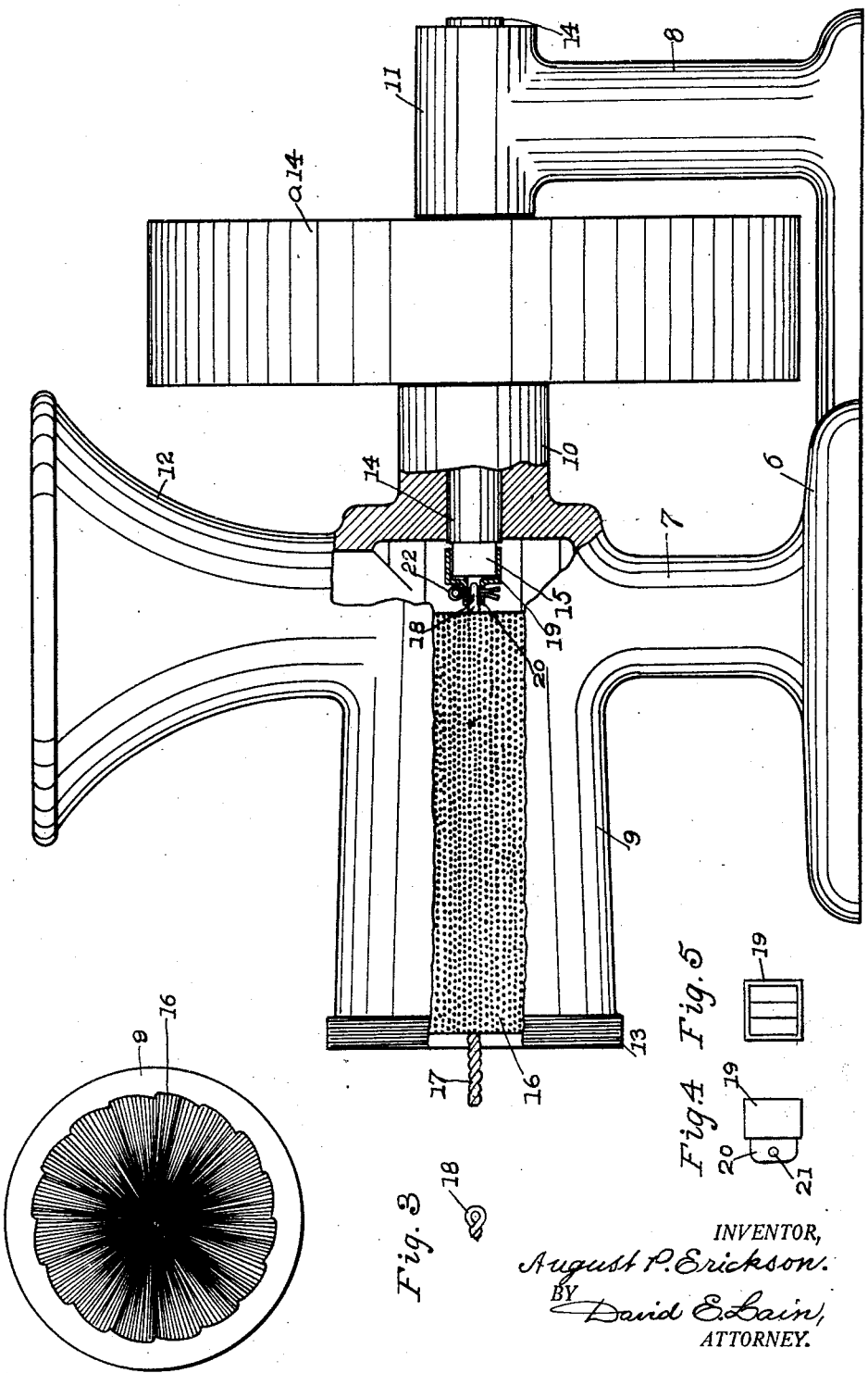

1,801,547

UNITED STATES PATENT OFFICE

AUGUST P. ERICKSON, OF BELLINGHAM, WASHINGTON

MEAT-GRINDER CLEANER

Application filed July 12, 1930. Serial No. 467,537.

My invention relates to improvements in meat grinder cleaners and has for an object to provide a brush suitable for inserting in the meat grinder, after the grinder plate and screw have been removed therefrom, to be engaged by the driving mechanism of the grinder whereby, with the addition of water in the grinder, the barrel thereof may be quickly and thoroughly cleaned by the power-driven brush.

Another object of my improvement is to provide suitable engagement means between the brush and the grinder driving mechanism to make the desired connections therebetween adaptable for quick engagement and release and yet sufficiently durable for the objects sought. Other objects of my improvement will appear as the description proceeds.

I attain these and other objects of my improvement with the mechanism illustrated in the accompanying sheet of drawings, which form a part of this specification, in which Figure 1 is a side elevation of a meat grinder properly dismantled for the introduction of my cleaning mechanism therein and with the cleaning device in place in the grinder, Fig. 2, is an end elevation of the uncovered rear end of the barrel of the grinder, limited to said barrel end, with the cleaning brush therein, Fig. 3 is a view of the eye shank of the brush broken away from the brush, Fig. 4 is an elevation view of a side of the socket to engage with the grinder shaft and Fig. 5 is an end elevation of Fig. 4.

Similar characters refer to similar parts throughout, and certain parts are broken away to show other parts hidden thereby.

With more particular reference to the designated parts: On base 6 of a meat grinder is leg 7 fastened to the barrel thereof and leg 8 supporting the outer bearing 11. Barrel 9 on leg 7 has bearing 10 on the front end thereof in line with bearing 11 and in said bearings shaft 14 is mounted for revolution. On shaft 14 between the said bearings is fastened pulley a14 suited for belt connection with a source of power revolutions. Hopper 12 connects with the front end of barrel 9 as usual. On the exterior of the barrel is threaded body 13 to engage the clamping ring which secures the grinder plate with screw bearing as usual, but which have been removed to prepare the grinder for cleaning with my device. The inner protruding end 15 of shaft 14 is reduced to a square cross section to engage in a square hole in the end of the grinder screw as usual, which, as stated, has been removed to make room for cleaning brush 16. Brush 16 is preferably of shape and size to fill barrel 9 and is made of suitable fibers fastened in twisted wire shaft 17 the front end of which is shaped to form eye 18.

Socket 19 is made to fit on and engage with square shaft end 15 and has two transverse flanges 20 spaced to admit brush eye 18 to intervene. Through openings 21 opposite each other in flanges 20 cotter pin 22 is extended to also pass through intervening eye 18 and engage socket 19 in toggle-joint connection with brush shaft 17.

To use my meat grinder cleaner: The grinder is dismantled of the grinding mechanism, leaving it free therefrom as shown in Fig. 1. Brush 16 having socket 19 fastened on the eye end of shaft 17 thereof is extended into barrel 9 with its eye end foremost and socket 19 is engaged on the end 15 of shaft 14 thus connecting the brush with the driving mechanism of the grinder. Shaft 14 is caused to revolve and water is poured into hopper 12. Brush 16 is thus caused to revolve in barrel 9 and, while permitting water to flow through the barrel on the inner wall thereof, retains a quantity thereof in the front end of the barrel between the same and the front end of the brush where it is caused to violently whirl in all directions to quickly remove all extraneous material from the walls of the grinder thereat. Meanwhile, the brush ends are rapidly moving over the barrel walls with a quantity of water passing therebetween and all loose materials thereon are quickly dislodged to pass outward with the flowing water. Thus the grinder barrel is quickly and thoroughly cleaned without the introduction of the hand thereinto which is saved from bruises often occurring thereto when used for this purpose.

In practice it has been found that the disclosed engagement of socket 19 on shaft end 15 is sufficiently durable for the purpose desired and when the barrel is properly cleaned by the revolving brush and water the brush is removed by withdrawing it from the grinder barrel and the cleaning operation is finished.

Having thus disclosed my invention, what I claim as new therein and desire to secure by Letters Patent is—

1. A brush adapted to revolve in the barrel of a meat grinder, a central shaft in the brush having engagement means on one end thereof, and a mechanical power connection coupled to the said brush-shaft end adapted for removable engagement with the end of the driving shaft of the meat grinder at the front end of the barrel thereof.

2. A brush adapted to revolve in the barrel of a meat grinder, a central shaft in the brush having an eye in one end thereof, and a socket adapted to drivingly engage the end of the driving shaft of the grinder in the front end of the grinder barrel also suited for coupling to the brush-shaft eye.

AUGUST P. ERICKSON.